(12) United States Patent  
Oshiba et al.

(10) Patent No.: US 7,447,894 B2
(45) Date of Patent: Nov. 4, 2008

(54) MICROCOMPUTER HAVING A NONVOLATILE MEMORY WHICH STORES A PLURALITY OF BIOSES

(75) Inventors: Masashi Oshiba, Tachikawa (JP); Yoshiaki Sato, Kodaira (JP); Kentaro Yamakawa, Kodaira (JP); Yoko Yamaki, Kodaira (JP); Hiroshi Kishi, Akishima (JP)

(73) Assignees: Renesas Technology Corp., Tokyo (JP); Renesas Northern Japan Semiconductor, Inc., Chitose-Shi, Hokkaido (JP)

( * ) Notice: Subject to any disclaimer, the term of this patent is extended or adjusted under 35 U.S.C. 154(b) by 294 days.

(21) Appl. No.: 10/901,344

(22) Filed: Jul. 29, 2004

(65) Prior Publication Data
US 2005/0050312 A1 Mar. 3, 2005

(30) Foreign Application Priority Data
Sep. 2, 2003 (JP) ............................. 2003-310126

(51) Int. Cl.
*G06F 9/22* (2006.01)
(52) U.S. Cl. ................................. 713/2; 713/1; 711/153
(58) Field of Classification Search .................... 713/1, 713/2; 711/153
See application file for complete search history.

(56) References Cited

U.S. PATENT DOCUMENTS

| 5,881,295 | A | * | 3/1999 | Iwata ........................ 710/262 |
| 5,892,943 | A | * | 4/1999 | Rockford et al. ............... 713/2 |
| 6,122,748 | A | * | 9/2000 | Hobson ..................... 713/323 |
| 6,757,838 | B1 | * | 6/2004 | Chaiken et al. ................ 714/5 |
| 7,103,766 | B2 | * | 9/2006 | Cepulis et al. .................. 713/2 |
| 7,114,064 | B2 | * | 9/2006 | Ramesh et al. ................. 713/1 |
| 2002/0104030 | A1 | * | 8/2002 | Ahn .......................... 713/310 |

OTHER PUBLICATIONS

Intel Low Pin Count (LPC) Interface Specification, Aug. 2002, Revision 1.1, pp. 1-54.*

* cited by examiner

*Primary Examiner*—Thuan N Du
(74) *Attorney, Agent, or Firm*—Miles & Stockbridge P.C.

(57) ABSTRACT

A microcomputer capable of reducing a board area, enhancing the security, and improving the usability is provided. A microcomputer to be used in a notebook PC is disclosed, in which programs of a keyboard/power management BIOS and a system BIOS are stored in a built-in flash memory ROM. In order to set read (R)/write (W) protect to the BIOSes stored in the flash memory ROM, a read/write protect setting register is provided, and at initial setting after the release of reset, flags of R/W permission, R permission/W prohibition, W permission/R prohibition, and R/W prohibition are set to this register by a central processing unit CPU. By doing so, it becomes possible to achieve protection such as the prevention of error writing of the BIOS and the like between a host machine and the flash memory ROM via a LPC bus.

8 Claims, 10 Drawing Sheets

FIG. 6A

| PORT |
|---|
| LPC,INT |
| PORT |
|  |
| IrDA |
| IIC0,INT,DMAC |
| FLASH,PWM |

| SYSC |
|---|
| IIC1/SCI1 |
| FRT |
| PWMX/SCI2 |
| PWMX,WDT0,PORT |
| BSC,SYSTEM,INT |
| TMR0,TMR1,PWM |
| IIC0 |
| AD,WDT1 |
| TMRX/TMRY |

FIG. 6B

| IIC1 |
|---|
| PWMX |
| TMRY |
| PORT |
| LPC,INT |
| PORT |
|  |
| IrDA |
| IIC0,INT,DMAC |
| FLASH,PWM |

| SYSC |
|---|
| SCI1 |
| FRT |
| SCI2 |
| PWMX,WDT0,PORT |
| BSC,SYSTEM,INT |
| TMR0,TMR1,PWM |
| IIC0 |
| AD,WDT1 |
| TMRX |

FIG. 7A

| REGISTER NAME | ACCESS CONDITIONS |
|---|---|
| KMIMR REGISTER (INT) | ACCESS IS MADE TO ADDRESS H'FFF1 AFTER SETTING STCR KINWUE = 1. |
| TCSR_X REGISTER (TMR_X) | ACCESS IS MADE TO ADDRESS H'FFF1 AFTER SETTING STCR KINWUE = 0 · TCONRS TMRX/Y = 0. |
| TCSR_Y REGISTER (TMR_Y) | ACCESS IS MADE TO ADDRESS H'FFF1 AFTER SETTING STCR KINWUE = 0 · TCONRS TMRX/Y = 1. |

FIG. 7B

| REGISTER NAME | ACCESS CONDITIONS |
|---|---|
| KMIMR REGISTER (INT) | ACCESS TO ADDRESS H'FE83 |
| TCSR_X REGISTER (TMR_X) | ACCESS TO ADDRESS H'FFF1 |
| TCSR_Y REGISTER (TMR_Y) | ACCESS TO ADDRESS H'FEC9 |

FIG. 8A

| | |
|---|---|
| 1 | |
| . | |
| 15 | |
| 16~21 | IRQ0~5 |
| 22 | IRQ6,KIN7~0 |
| 23 | IRQ7,KIN15~8,WUE7~0 |
| 24 | |
| . | |
| 32 | WUE15~8 |
| 33 | TPU |
| 34~47 | |
| 48~55 | |
| 56 | IRQ8 |

| | |
|---|---|
| 57 | IRQ9 |
| 58 | IRQ10 |
| 59 | IRQ11 |
| 60 | IRQ12 |
| 61 | IRQ13 |
| 62 | IRQ14 |
| 63 | IRQ15 |
| 64 | |
| . | |
| 75 | |
| 76~78 | TMR_X |
| 79 | |
| . | |
| 95 | |
| 96~101 | KBU |
| 102,103 | |
| 104~111 | LPC |
| 112~119 | |

FIG. 8B

| | |
|---|---|
| 1 | |
| . | |
| 15 | |
| 16~21 | IRQ0~5 |
| 22 | IRQ6 |
| 23 | IRQ7 |
| 24 | |
| . | |
| 29 | |
| 30 | KIN7~0 |
| 31 | KIN15~8 |
| 32 | WUE7~0 |
| 33 | WUE15~8 |
| 34~47 | TPU |
| 48~55 | |
| 56 | IRQ8 |

| | |
|---|---|
| 57 | IRQ9 |
| 58 | IRQ10 |
| 59 | IRQ11 |
| 60 | IRQ12 |
| 61 | IRQ13 |
| 62 | IRQ14 |
| 63 | IRQ15 |
| 64 | |
| . | |
| 75 | |
| 76~78 | TMR_X |
| 79 | |
| . | |
| 95 | |
| 96~101 | KBU |
| 102,103 | |
| 104~111 | LPC |
| 112~119 | |

MICROCOMPUTER HAVING A NONVOLATILE MEMORY WHICH STORES A PLURALITY OF BIOSES

CROSS-REFERENCE TO RELATED APPLICATION

The present application claims priority from Japanese Patent Application No. JP 2003-310126 filed on Sep. 2, 2003, the content of which is hereby incorporated by reference into this application.

TECHNICAL FIELD OF THE INVENTION

The present invention relates to a microcomputer, more specifically, it relates to a technique advantageous when applied to a microcomputer in a keyboard/power management controller of a notebook personal computer (notebook PC) and the likes.

BACKGROUND OF THE INVENTION

According to the examinations by the inventors of the present invention, techniques as follows are known in the field of microcomputers in notebook PCs.

For example, in a notebook PC according to the prior art, a microcomputer in a keyboard/power management controller is provided with a keyboard BIOS that controls key scan and input devices such as a keyboard and a mouse and a power management BIOS that controls a battery and a fan, and the microcomputer is controlled by programs of these two BIOSes. In a notebook PC having such a microcomputer in a keyboard/power management controller, a system BIOS is also provided, by which the entire system thereof is controlled.

As mentioned above, in a conventional notebook PC, a microcomputer provided with keyboard/power management BIOS and a flash memory containing a system BIOS are provided and they are built in as separate chips. Also, in a microcomputer provided with a keyboard/power management BIOS, in order to reduce the area of address space/interrupt vector space, register address/interrupt vector is shared by plural modules. Further, in order to reduce the number of terminals, a single terminal is provided with several functions.

Meanwhile, examinations of the technique for such a microcomputer of a notebook PC as mentioned above by the inventors of this invention have revealed the followings.

For example, since the keyboard/power management BIOS and the system BIOS are built in each of the separate chips in the conventional notebook PC mentioned above, the area of a board is inevitably increased. Further, since the system BIOS is built in the chip of a flash memory, it has a problem of security.

Furthermore, in order to reduce the area of address space/interrupt vector space, register address/interrupt vector is shared by plural modules in the microcomputer provided with the keyboard/power management BIOS. Therefore, when creating a program, it is necessary always to be aware of which module is controlled. As a result, its usability is not so high. Moreover, since a single terminal is provided with several functions in order to reduce the number of terminals, there are many pin multiplexes, and there is a problem that some of functions cannot be used simultaneously.

SUMMARY OF THE INVENTION

Accordingly, an object of the present invention is to provide a microcomputer that enables to reduce the board area of a notebook PC and enhance the security and to improve the usability thereof.

The above and other objects and novel advantages of the present invention will become apparent from the detailed description below and the attached drawings.

The outline of a representative aspect of the present invention is briefly explained as below.

The present invention is applied to a microcomputer of embedded control type provided with a nonvolatile memory (flash memory) built therein, and the nonvolatile memory stores a first program that controls the microcomputer (microcomputer control BIOS), a second program that controls keyboard (key input)/power management (power supply management) (keyboard/power management BIOS), and a third program that is executed by a CPU of a host machine connected to the microcomputer (system BIOS).

In this microcomputer, at least one of the first, second and third programs stored in the nonvolatile memory has the means for setting the read/write security protect. Further, an LPC is provided therein, and when a system in which the microcomputer is built in is started, a function to read the first, second and third programs stored in the nonvolatile memory is performed via the LPC, and when the system is updated, a function to write the first, second and third programs is performed via the LPC.

Further, in the microcomputer according to the present invention, in order to secure the compatibility with conventional microcomputers and enable to select an old one or a new one, it is possible to select the pin functions of pin multiplex by register settings and which pin function should be used is set by the first program, and also, it is possible to set the plural modes of address mapping of control registers of a CPU and which mode should be used is set by the first program, and furthermore, it is possible to set the plural modes of interrupt vector table of the CPU and which mode should be used is set by the first program.

Effects to be obtained by representative aspects of the present invention are briefly explained as below.

(1) Board area can be reduced, and security can be enhanced.

(2) Usability of a microcomputer in a keyboard/power management controller can be improved.

BRIEF DESCRIPTIONS OF THE DRAWINGS

FIG. 6A and FIG. 6B are explanatory diagrams of address mapping of control registers of the CPU in a notebook PC using a microcomputer according to an embodiment of the present invention;

FIG. 7A and FIG. 7B are explanatory diagrams showing the examples of the mapping of INT and TMR in a notebook PC using a microcomputer according to an embodiment of the present invention;

FIG. 8A and FIG. 8B are explanatory diagrams of mapping of an interrupt vector table of the CPU in a notebook PC using a microcomputer according to an embodiment of the present invention;

DESCRIPTIONS OF THE PREFERRED EMBODIMENTS

Hereinafter, an embodiment of the present invention will be described in detail with reference to the accompanying drawings. Note that components having the same function are denoted by the same reference symbols throughout the drawings for describing the embodiment, and the repetitive description thereof will be omitted.

Figure 1:
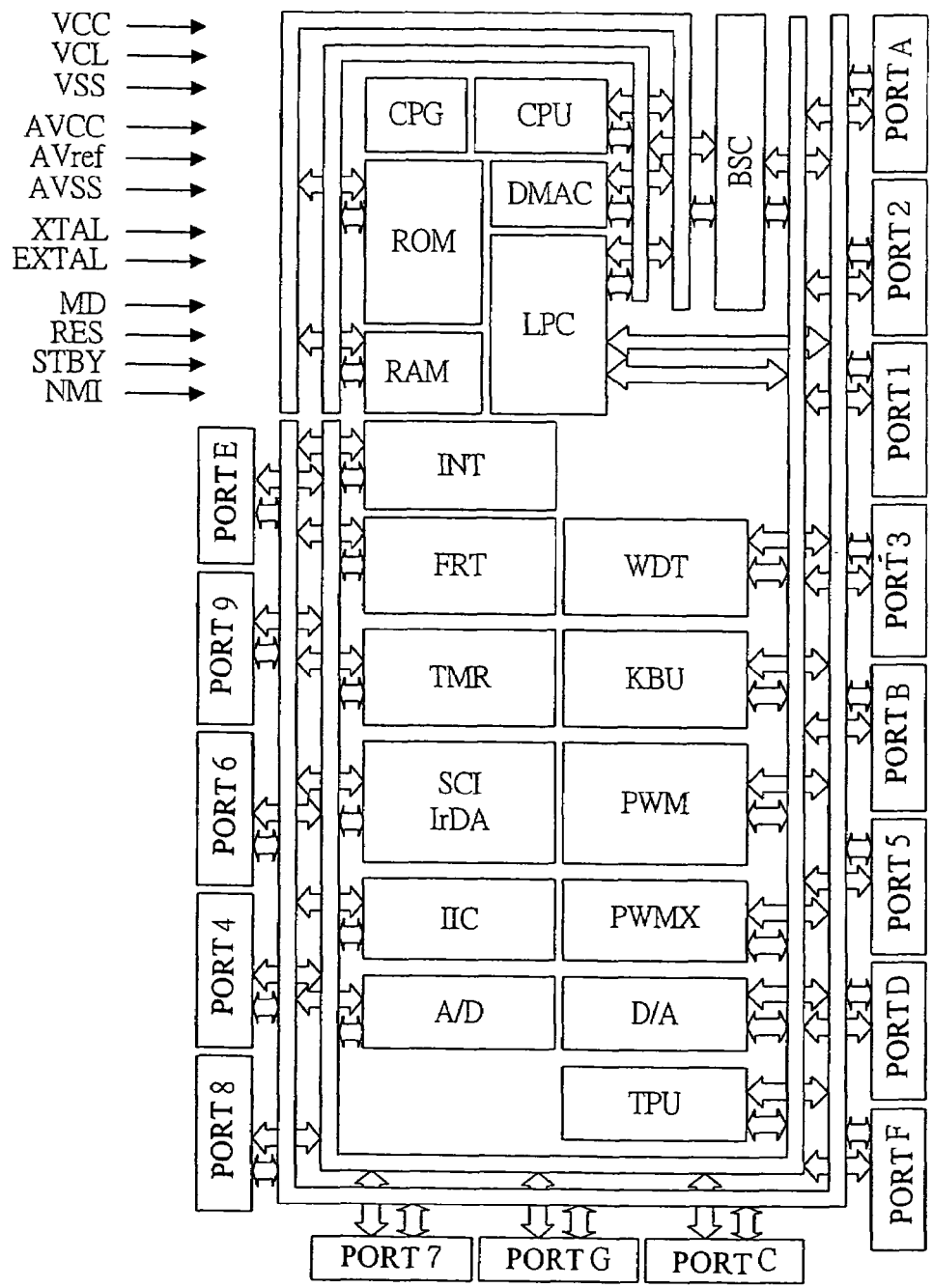
FIG. 1 is a schematic block diagram showing a configuration of a microcomputer according to an embodiment of the present invention.

First, an example of the entire configuration of a microcomputer according to an embodiment of the present invention will be described with reference to FIG. 1. FIG. 1 is a schematic block diagram showing a configuration of a microcomputer.

The microcomputer according to this embodiment is, for example, a microcomputer in a keyboard/power management controller and comprises modules including a central processing unit CPU, a clock oscillator CPG, a flash memory ROM, a random access memory RAM, a direct memory access controller DMAC, a bus controller BSC, an LPC interface LPC, an interrupt controller INT, an 8-bit PWM timer PWM, a 14-bit PWM timer PWMX, a 16-bit free running timer FRT, a 16-bit timer pulse unit TPU, an 8-bit timer TMR, a watch dog timer WDT, a serial communication interface SCI, an IrDA, an IIC bus interface IIC, a keyboard buffer control unit KBU, an A/D converter A/D, a D/A converter D/A, an I/O circuit, and the likes. This microcomputer is formed on a chip by using a semiconductor manufacturing technology already known to those skilled in the art.

In this microcomputer, the respective modules are arbitrarily connected via an address bus and a data bus. Further, they can be connected to outside via ports (ports 1 to 9, A to G) and terminals of the I/O circuit. For example, signals including power supplies VCC, VCL, and VSS, analog power supplies AVCC, AVref, and AVSS, clock signals XTAL and EXTAL, an operation mode control signal MD, system control signals RES and STBY, an interrupt signal NMI and the likes are inputted from outside, and various kinds of data are inputted and outputted to/from outside.

In this microcomputer, a microcomputer control BIOS as a program to control this microcomputer, a keyboard/power management BIOS, and a system BIOS as a program that is executed by a CPU of a host machine connected to the microcomputer are stored especially in the flash memory ROM built in the microcomputer. The microcomputer control BIOS is a program by which initial settings of the microcomputer are carried out. The keyboard/power management BIOS is a program that controls key scan and input devices such as a keyboard and a mouse and also controls a battery and a fan. The system BIOS is a program that controls the entire system in which the microcomputer is embedded. The microcomputer control BIOS and the keyboard/power management BIOS are stored in the built-in flash memory ROM via terminals of the I/O circuit of the microcomputer 4 by setting the plural mode terminals MD to the write mode of the flash memory ROM and using a ROM writer that is connected to outside.

Further, this microcomputer especially includes the LPC interface LPC and when a system in which the microcomputer is built in is started, a function to read the microcomputer control BIOS, the keyboard/power management BIOS, and the system BIOS that are stored in the flash memory ROM is performed via the LPC interface LPC. Also, when the system is updated, a function to write the microcomputer control BIOS, the keyboard/power management BIOS, and the system BIOS is performed via the LPC interface LPC. The LPC (Low Pin Count) is an internal bus for a peripheral device proposed by Intel Corporation in the USA and is characterized by a clock synchronous parallel bus (4 data lines, 3 control signal lines, 33 MHz operations) and a command-based communication protocol.

Figure 2:
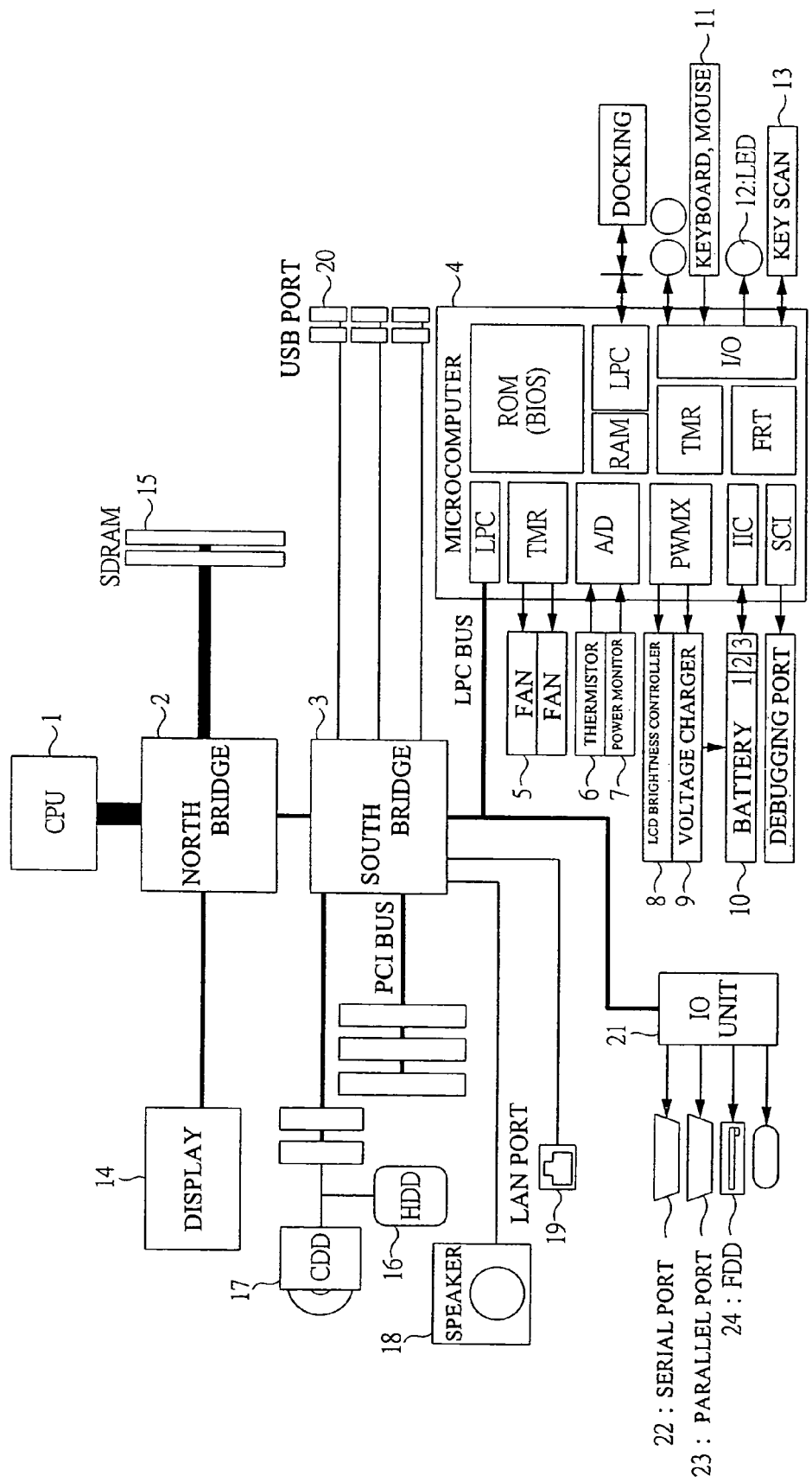
FIG. 2 is a schematic block diagram showing a configuration of a notebook PC employing a microcomputer according to an embodiment of the present invention.

Next, an example of a configuration of a notebook PC employing a microcomputer according to an embodiment will be described with reference to FIG. 2. FIG. 2 is a schematic block diagram showing a configuration of a notebook PC employing the microcomputer.

The notebook PC employing the microcomputer according to this embodiment comprises a CPU 1 that performs the entire calculation process, a north bridge 2 and a south bridge 3 that respectively control mutual data transfer, the microcomputer 4 mentioned above, fans 5 as cooling devices, a thermistor 6 that monitors temperature, a power monitor 7 that monitors electric power, an LCD brightness controller 8 that controls the brightness of an LCD as a display device, a voltage charger 9 that charges a battery, a battery 10 as a power source, a keyboard and a mouse 11 as input devices, an LED 12 as a display unit, a key scan 13 and the likes. In this notebook PC, respective ICs of the CPU 1, the north bridge 2, the south bridge 3, the microcomputer 4 and so forth are mounted on a board and packaged in a case of the notebook PC.

A display 14, a memory device of an SDRAM (Synchronous DRAM) 15 and the likes are connected to the north bridge 2. Disk drives of an HDD (Hard Disk Drive) 16 and a CDD (Compact Disk Drive) 17, a speaker 18, a LAN port 19, a USB port 20 and so forth are connected to the south bridge 3. Further, this south bridge 3 is connected to an I/O unit 21 via an LPC bus, and further, a serial port 22, a parallel port 23, an FDD (Floppy (R) Disk Drive) 24 and the likes are connected to this I/O unit 21.

In this microcomputer 4 of a notebook PC, the fans 5 are controlled by the 8-bit timer TMR, and monitoring results of the thermistor 6 and the power monitor 7 are inputted to the A/D converter A/D, while the LCD brightness controller 8 and the voltage charger 9 are controlled by the 14-bit PWM timer PWMX, and the battery 10 is charged via an IIC (Inter IC Bus) bus interface IIC. In addition, the keyboard and mouse 11, the LED 12, the key scan 13 and so forth are connected via the I/O circuit.

Figure 3:
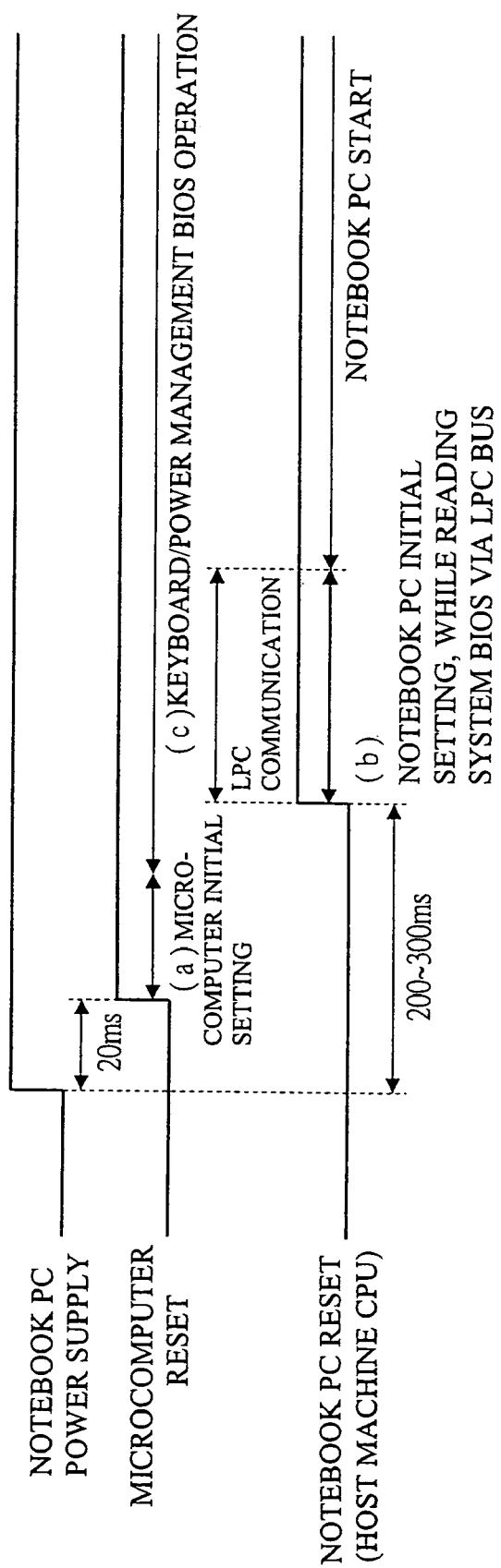
FIG. 3 is a timing chart of operations of a notebook PC using a microcomputer according to an embodiment of the present invention.
Figure 4A:
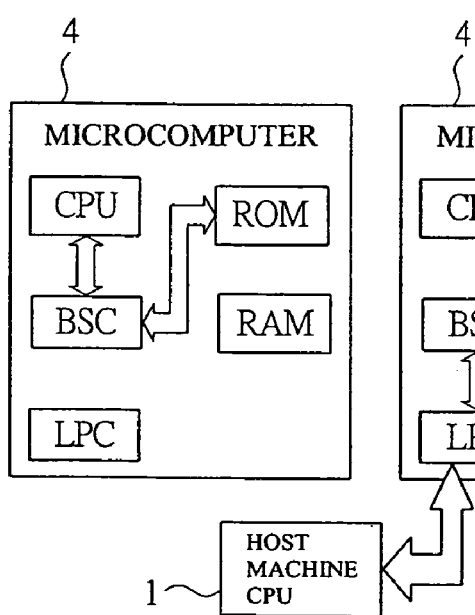
FIG. 4A to FIG. 4C are explanatory diagrams of signal routes in each of the operations in a notebook PC using a microcomputer according to an embodiment of the present invention.
Figure 4B:
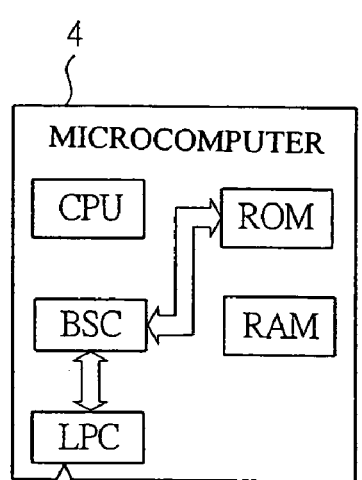

Next, on the basis of FIG. 3, one example of the operation of the notebook PC using the microcomputer according to the embodiment will be described with reference to FIG. 4. FIG. 3 is a timing chart of the operation of the notebook PC using the microcomputer and FIG. 4A to FIG. 4C are explanatory diagrams of signal routes in the respective operations.

When the notebook PC is turned on, the initial setting of the microcomputer 4 is carried out after for example about 20 ms. In this initial setting of the microcomputer 4, the central processing unit CPU reads the microcomputer control BIOS stored in the flash memory ROM via the bus controller BSC as shown in FIG. 4A and carries out the initial setting on the basis of this BIOS.

Further, after for example about 200 to 300 ms from the moment when the notebook PC is turned on, the initial setting of the notebook PC is carried out. In this initial setting of the notebook PC, the CPU 1 of the host machine reads the system BIOS stored in the flash memory ROM via the bus controller BSC and the LPC interface LPC as shown in FIG. 4B and carries out the initial setting on the basis of this system BIOS.

Figure 4C:
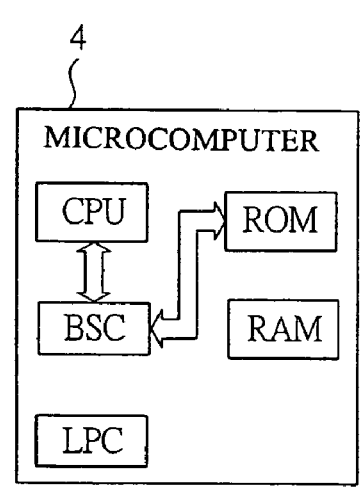

In parallel with this initial setting of the notebook PC, in the microcomputer 4, the central processing unit CPU reads the keyboard/power management BIOS stored in the flash memory ROM via the bus controller BSC as shown in FIG. 4C and operates on the basis of this keyboard/power management BIOS.

Figure 5:
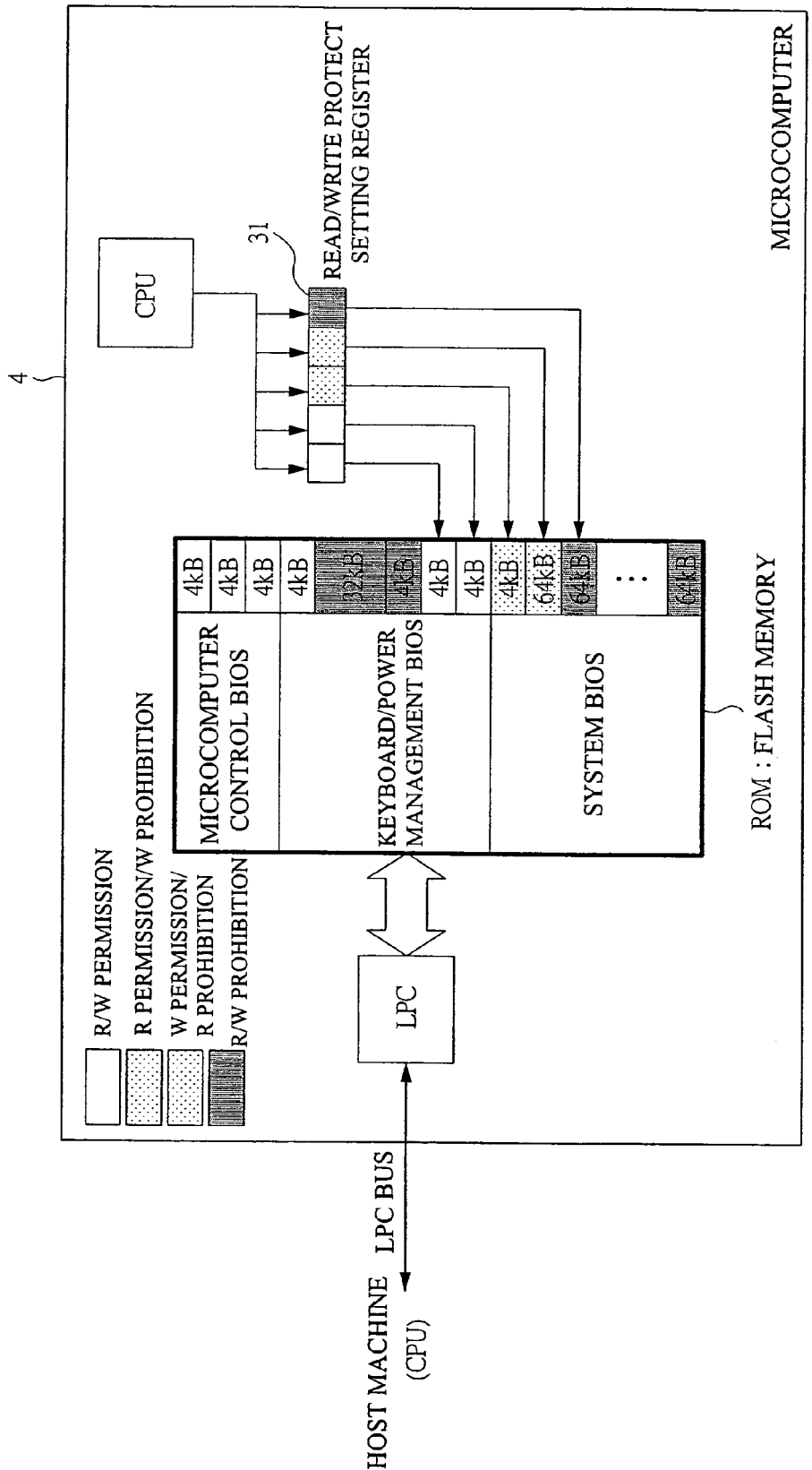
FIG. 5 is an explanatory diagram of the method to set the security protect to the program stored in the flash memory in a notebook PC using a microcomputer according to an embodiment of the present invention.

Next, one example of the method to set the security protect to the programs stored in the flash memory will be described with reference to FIG. 5. FIG. 5 is an explanatory diagram of the method to set the security protect to the program stored in the flash memory.

As mentioned above, the respective programs of the microcomputer control BIOS, the keyboard/power management BIOS, and the system BIOS are stored in the flash memory ROM built in the microcomputer 4. In order to set read (R)/write (W) protect to the BIOSes stored in this flash memory ROM, a read/write protect setting register 31 is provided, and at the time of the initial setting after the release of reset, flags of R/W permission, R permission/W prohibition, W permission/R prohibition, and R/W prohibition are set to this register 31 by the central processing unit CPU. By doing so, it becomes possible to achieve protection such as the prevention of error writing of BIOS and the like between the host machine (CPU) and the flash memory ROM via the LPC interface LPC and the LPC bus.

For example, in FIG. 5, the first bit portion (4 kB+4 kB) of a part of the keyboard/power management BIOS is set to R/W permission, while the second bit portion (4 kB) of a part of the system BIOS is set to R permission/W prohibition, the third bit portion (64 kB) thereof is set to W permission/R prohibition, and the fourth bit portion (64 kB) thereof is set to R/W prohibition. Accordingly, with regard to the system BIOS, the write protect is set to the second bit portion, the read protect is set to the third bit portion, and the read/write protect is set to the fourth bit portion, and hence, read and/or write is protected in each portion.

Next, one example of the method to set which of plural modes in address mapping of control registers of the CPU will be described with reference to FIG. 6 and FIG. 7. In concrete, FIG. 6A and FIG. 6B are explanatory diagrams of address mapping of control registers of the CPU, and FIG. 7A and FIG. 7B are explanatory diagrams showing the examples of the mapping of INT and TMR. FIG. 6A and FIG. 7A show conventional old ones as comparative examples, while FIG. 6B and FIG. 7B show newly developed ones to which the present invention is applied.

As shown in FIG. 6A, in the conventional old one, a register address is shared by plural modules. For example, in FIG. 6A, one register address is shared by two modules of IIC1/SCI1, PWMX/SCI2, and TMRX/TMRY, respectively. On the contrary, as shown in FIG. 6B, in the newly developed one, each one module of IIC1, PWMX, TMRY, SCI1, SCI2, and TMRX is allotted to one register address. Which of these old one mode and new one mode is to be used is set by the keyboard/power management BIOS at the initial setting after the release of reset.

Namely, since plural registers are mapped to one address in the case of the old one (RELOCATE=0), when accessing the registers, access to a target register can be made only after setting the access conditions. Consequently, the program becomes complicated.

In concrete, as shown in FIG. 7A, when accessing the registers at address: H'FFF1 in the old one (RELOCATE=0), in the case of the KMIMR register (INT), access is made to the address H'FFF1 after setting STCR KINWUE=1. In the same manner, in the case of the TCSR_X register (TMR_X), access is made to the address H'FFF1 after setting STCR KINWUE=0·TCONRS TMRX/Y=0, and in the case of the TCSR_Y register (TMR_Y), access is made to the address H'FFF1 after setting STCR KINWUE=0·TCONRS TMRX/Y=1.

Contrary to this, in the case of the new one, if RELOCATE=1 is set at the initial setting by the microcomputer control BIOS, plural registers are not mapped to one address. Therefore, the program does not become complicated.

In concrete, as shown in FIG. 7B, when accessing each address register in the new one (RELOCATE=1), in the case of the KMIMR register (INT), access is made directly to the address H'FE83. In the same manner, in the case of the TCSR_X register (TMR_X), access is made directly to the address H'FFF1, and in the case of the TCSR_Y register (TMR_Y), access is made directly to the address H'FEC9.

Next, one example of the method to select which of plural modes in an interrupt vector table of the CPU will be described with reference to FIG. 8 and FIG. 9. FIG. 8A and FIG. 8B are explanatory diagrams of mapping of an interrupt vector table of the CPU, and FIG. 9A and FIG. 9B are explanatory diagrams showing the examples of mapping of IRG and KIN (keyboard Matrix Input). FIG. 8A and FIG. 9A show the conventional old ones as comparative examples, while FIG. 8B and FIG. 9B show newly developed ones to which the present invention is applied.

As shown in FIG. 8A, in the conventional old one, an interrupt vector is shared by plural modules. For example, in FIG. 8A, one interrupt vector table is shared by two or three modules, that is, IRQ6/KIN7-0, and IRQ7/KIN15-8/WUE7-0, respectively. On the contrary, as shown in FIG. 8B, in the newly developed one, each one module of IRQ6, IRQ7, KIN7-0, KIN15-8, and WUE7-0 is allotted to one interrupt vector table. Which of these old one mode and new one mode is to be used is set by the microcomputer control BIOS at the initial setting after the release of reset.

Namely, in the case of the old one (EIVS=0), IRQ7 and IRQ6 interrupts and KIN7 to KIN0 interrupts function as IRQ6 interrupt factors. Therefore, there is one interrupt factor to seven terminals. As a result, a determination program for the factors is required. Further, since there is no way to distinguish IRQ interrupt from KIN interrupt, the program becomes complicated.

Figure 9A:
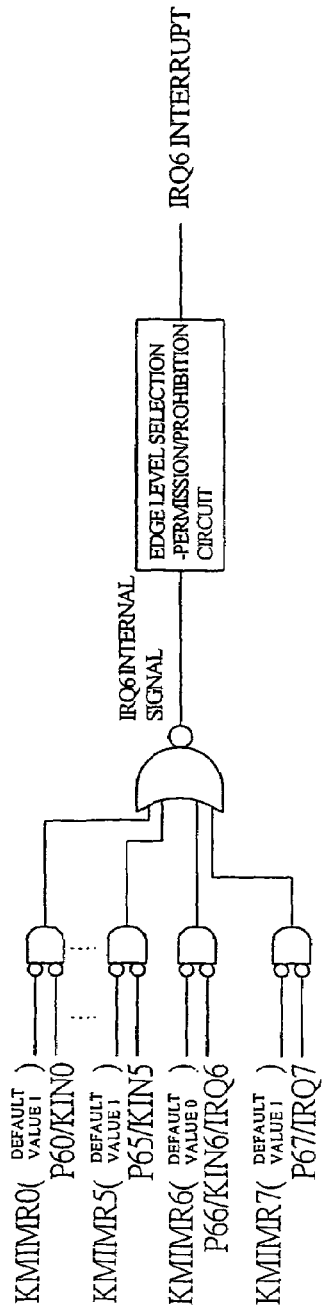
FIG. 9A and FIG. 9B are explanatory diagrams showing the examples of mapping of IRG and KIN in a notebook PC using a microcomputer according to an embodiment of the present invention.

In concrete, as shown in FIG. 9A, in the case of the old one (EIVS=0), KIN terminal interrupt signals KMIMR0 to KMIMR5 (default value 1) and terminal P60/KIN0 to terminal P65/KIN5 are logically calculated by an NOR gate, respectively. Similarly, KMIMR6 (default value 0), terminals P66/KIN6/IRQ6, KMIMR7 (default value 1), and a terminal P67/IRQ7 are logically calculated by the NOR gate, respectively. Furthermore, these calculation results are logically calculated by the NOR gate and set as an IRQ6 internal signal, and then, this signal is outputted as an IRQ6 interrupt factor via an edge level selection-permission/prohibition circuit.

Contrary to this, in the case of the new one, if EIV=1 is set at the initial setting by the microcomputer control BIOS, an IRQ7 interrupt functions as an IRQ7 interrupt factor, an IRQ6 interrupt functions as an IRQ6 interrupt factor, and KIN7 to KIN0 interrupts function as KIN7 to KIN0 interrupt factors. Accordingly, in each of the IRQ7 and IRQ6 interrupts, there is one interrupt factor. Therefore, the determination program for the factors becomes unnecessary.

Figure 9B:
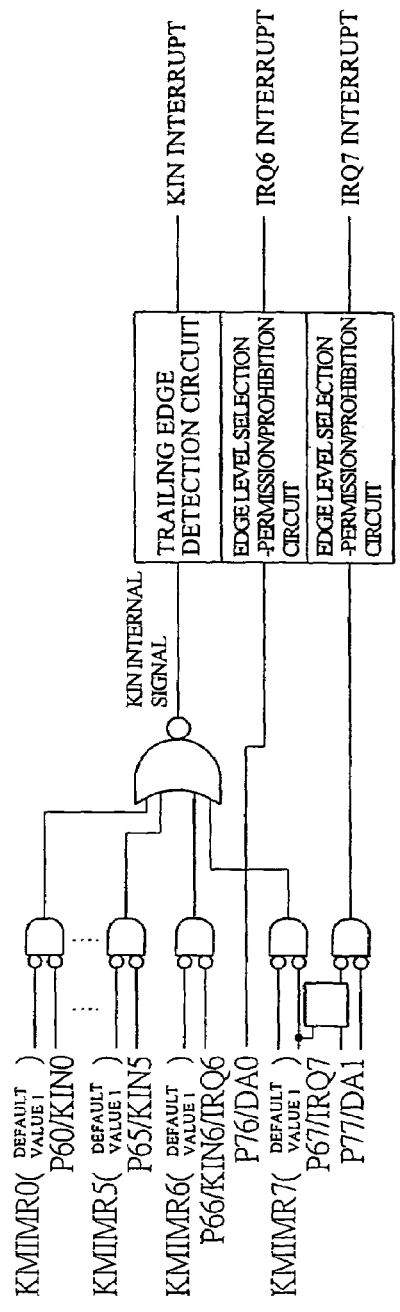

In concrete, as shown in FIG. 9B, in the case of the new one (EIVS=1), KMIMR0 to KMIMR7 (default value 1) and terminal P60/KIN0 to terminal P67/IRQ7 are logically calculated by the NOR gate, respectively. Furthermore, these calculation results are logically calculated by the NOR gate and set as a KIN internal signal, and then, this signal is outputted as a KIN interrupt factor via a trailing edge detection circuit. In addition, terminal P76/DA0 is outputted as an IRQ6 interrupt factor via the edge level selection-permission/prohibition circuit. Also, terminal P67/IRQ7 and terminal P77/DA1 are logically calculated by the NOR gate, and the calculation result thereof is outputted as an IRQ7 interrupt factor via the edge level selection-permission/prohibition circuit.

Figure 10:
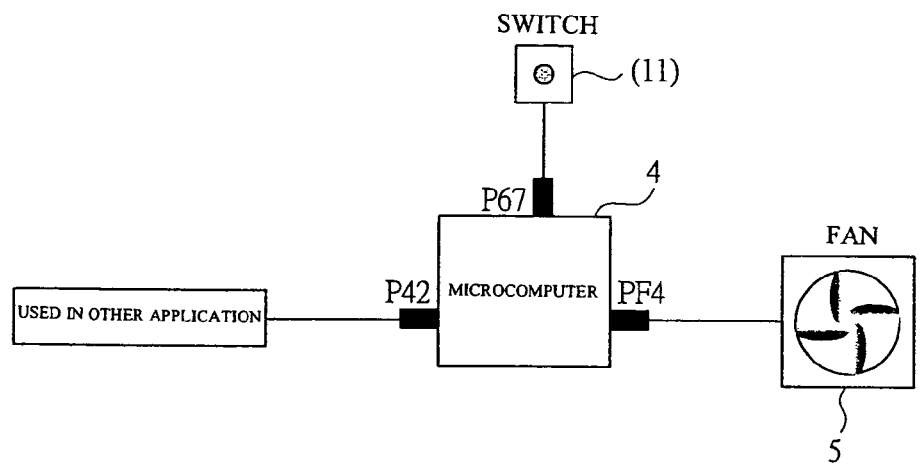
FIG. 10 is an explanatory diagram of the case of using external interrupt input and timer output in a notebook PC using a microcomputer according to an embodiment of the present invention.

Next, one example of the method to set which of pin functions to be used by pin multiplex will be described with reference to FIG. 10 and FIG. 11. FIG. 10 is an explanatory diagram of the case of using external interrupt input and timer output, and FIG. 11 is an explanatory diagram of the case of using IIC terminal.

As shown in FIG. 10, in the case where IQR (Interrupt Request terminal)/KIN (Keyboard Matrix Input terminal) (external interrupt) and TMOX (Timer Output (Channel TMR#X) terminal) (timer output) are to be used, a user A uses the terminal P67 of the terminals of the microcomputer 4 as IRQ input for a switch (keyboard and mouse 11) and the terminal PF4 (the fourth terminal of port F) as timer output for the fan 5. As another use method, a user B uses the terminal P42 (the second terminal of port 4) as IRQ input (switch) and the terminal P67 (the seventh terminal of port 6) as timer output (fan), while a user C uses the terminal P42 as IRQ input (switch), the terminal P67 as KIN input (switch), and the terminal PF4 as timer output (fan).

As mentioned above, since the methods of using the terminal functions differ depending on the users, it is possible to increase the usability for users by using the pin multiplex function. Which of the pin functions should be used in this pin multiplex function is set by the keyboard/power management BIOS at the initial setting after the release of reset.

Figure 11:
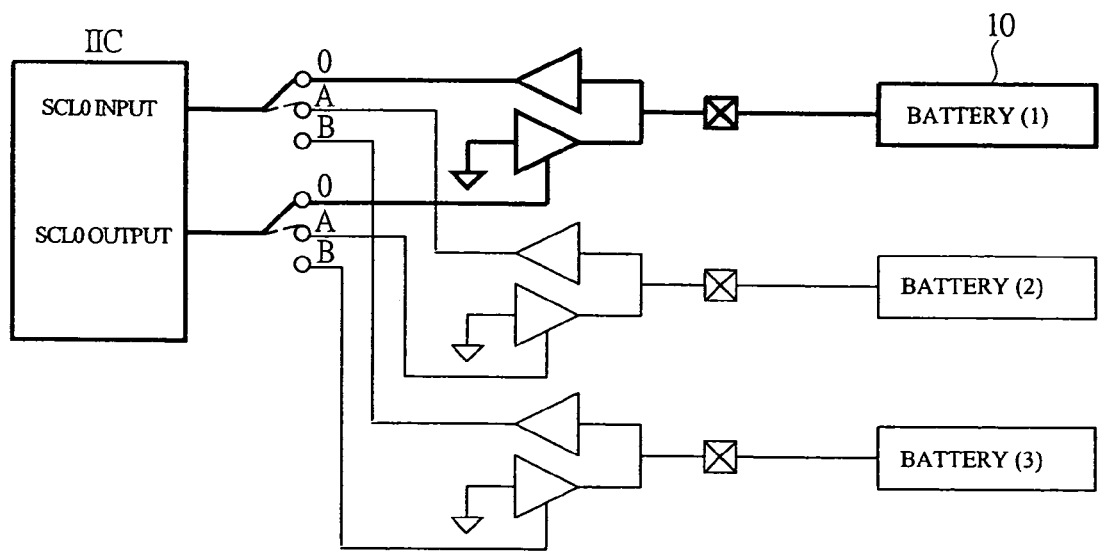
FIG. 11 is an explanatory diagram of the case of using IIC terminal in a notebook PC using a microcomputer according to an embodiment of the present invention.

As shown in FIG. 11, for example, in the case of using the IIC terminal, it is possible to select from three terminals and three batteries 10 are connected to the three terminals, and in this state, the battery (1) is used. However, in the case where the battery (1) becomes faulty and does not respond or the remaining amount of the battery becomes zero, the IIC terminal is switched (0 to A) as shown by the broken line to use the battery (2). Further, it is also possible to switch to the battery (3). These operations are controlled by the keyboard/power management BIOS.

Therefore, according to the microcomputer 4 in this embodiment and a notebook PC employing this microcomputer 4, in addition to the keyboard/power management BIOS, the system BIOS is also stored in the flash memory ROM built in the microcomputer 4. Therefore, it is possible to reduce the board area. Furthermore, since the security protect of read/write of the system BIOS can be set by the registers, it is possible to enhance the security.

Moreover, since register address/interrupt vectors/pin multiplex functions can be selected by register settings, it is possible to improve the usability for users.

In the foregoing, the invention made by the inventors of the present invention has been concretely described based on the embodiment. However, it is needless to say that the present invention is not limited to the foregoing embodiment and various modifications and alterations can be made within the scope of the present invention.

For example, in the embodiment above, the case where a flash memory is used as an example of a nonvolatile memory has been described. However, the present invention can be applied also to other nonvolatile memories such as an EEPROM or the like.

Further, the present invention is effective when applied to a notebook PC as mentioned above, however, the present invention can be also applied widely to a desktop PC, a PC server, and so forth. Especially, it can be preferably applied to a microcomputer used in a system that requires plural BIOSes.

What is claimed is:

1. A microcomputer formed on a single chip semiconductor substrate, the microcomputer comprising:
   a central processing unit coupled to an address bus and to a data bus;
   a nonvolatile memory coupled to said address bus and said data bus, said nonvolatile memory including a first area that stores a first BIOS program which controls said microcomputer, a second area that stores a second BIOS program which controls an input device coupled to said microcomputer, and a third area that stores a third BIOS program which is to be executed by an external CPU of a host machine coupled to said microcomputer; and
   a Low Pin Count ("LPC") interface circuit coupled to said address bus, to said data bus, and configured to be coupled to an external LPC bus outside said microcomputer,
   wherein said central processing unit accesses said nonvolatile memory to execute said first BIOS program via said address bus and said data bus, and
   wherein said LPC interface circuit is configured to access said nonvolatile memory to read said third BIOS program and to provide said third BIOS program to the external LPC bus coupled thereto for execution by the external CPU of the host machine.

2. The microcomputer according to claim 1,
   wherein said first BIOS program is a microcomputer control BIOS for initialization of said microcomputer,
   said second BIOS program is a keyboard/power management BIOS which controls key input of the input device and power supply, and
   said third BIOS program is a system BIOS which controls the CPU of the host machine.

3. The microcomputer according to claim 2, further comprising a security protect circuit which sets read/write protection for at least one of said first, second, and third BIOS programs stored in said nonvolatile memory.

4. The microcomputer according to claim 2,
   wherein, when a system in which said microcomputer is embedded is started, said first BIOS program is executed by said central processing unit, said third BIOS program stored in said nonvolatile memory is read out by said LPC interface circuit, to be provided to the CPU of the host machine via the external LPC bus.

5. The microcomputer according to claim 4, wherein, when a system in which said microcomputer is embedded is updated, a function to write said first, second, and third BIOS programs stored in said nonvolatile memory is to be performed via said LPC interface circuit.

6. The microcomputer according to claim 4, wherein pin functions by pin multiplex are selected by register settings, and which pin function is to be used is set by said second BIOS program.

7. The microcomputer according to claim 4, further including an internal CPU,
wherein plural modes of address mapping of control registers of a said internal CPU can be set, and which mode is to be used is set by said first BIOS program.

8. The microcomputer according to claim 4, further including an internal CPU,
wherein plural modes of an interrupt vector table of a said internal CPU can be set, and which mode is to be used is set by said first BIOS program.

* * * * *